US011442663B2

(12) United States Patent
Gong et al.

(10) Patent No.: US 11,442,663 B2
(45) Date of Patent: Sep. 13, 2022

(54) MANAGING CONFIGURATION DATA

(71) Applicant: EMC IP Holding Company LLC, Hopkinton, MA (US)

(72) Inventors: Shaoqin Gong, Beijing (CN); Geng Han, Beijing (CN); Xinlei Xu, Beijing (CN); Jian Gao, Beijing (CN); Jianbin Kang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 205 days.

(21) Appl. No.: 16/890,345

(22) Filed: Jun. 2, 2020

(65) Prior Publication Data

US 2021/0132862 A1 May 6, 2021

(30) Foreign Application Priority Data

Oct. 31, 2019 (CN) .......................... 201911053145.7

(51) Int. Cl.
*G06F 3/06* (2006.01)
*G06F 16/23* (2019.01)

(52) U.S. Cl.
CPC .......... *G06F 3/0659* (2013.01); *G06F 3/0604* (2013.01); *G06F 3/0656* (2013.01); *G06F 3/0673* (2013.01); *G06F 3/0689* (2013.01); *G06F 16/2379* (2019.01)

(58) Field of Classification Search
CPC .... G06F 3/0689; G06F 3/0604; G06F 3/0656; G06F 3/0617
See application file for complete search history.

(56) References Cited

U.S. PATENT DOCUMENTS

| 7,562,250 | B2 | 7/2009 | Wahl et al. |
| 8,166,314 | B1 | 4/2012 | Raizen et al. |
| 8,261,068 | B1 | 9/2012 | Raizen et al. |
| 8,416,954 | B1 | 4/2013 | Raizen et al. |
| 8,966,281 | B1 | 2/2015 | Raizen et al. |
| 10,645,158 | B1 | 5/2020 | Ippatapu |
| 11,010,054 | B1 | 5/2021 | Himelstein et al. |
| 11,023,433 | B1 | 6/2021 | Datta et al. |
| 2016/0202920 | A1* | 7/2016 | Vellimalai ............. G06F 3/0613 711/114 |
| 2017/0083377 | A1* | 3/2017 | Muthuvaradharajan ..................... G06F 11/0793 |

(Continued)

*Primary Examiner* — Tracy A Warren
(74) *Attorney, Agent, or Firm* — BainwoodHuang

(57) ABSTRACT

Techniques involve detecting whether a transaction of modifying configuration data of a storage system is initiated, the configuration data being stored in a database and a buffered version being stored in memory independent of the database. The techniques further involve in accordance with detection that the transaction is initiated, building a data buffer to buffer a section to be modified, the data buffer being mapped to a storage sector of the memory in which the section is expected to be stored. The techniques further involve determining whether the transaction successfully completed and in accordance with a determination that the transaction fails to successfully complete, releasing the data buffer and aborting the transaction, without modifying the buffered version. Accordingly, the configuration data in the memory remains as the previous version and are not modified before the transaction is successfully completed, which makes it possible to abort the transaction.

23 Claims, 6 Drawing Sheets

(56) References Cited

U.S. PATENT DOCUMENTS

2019/0042355 A1\* 2/2019 Ptak ................. G06F 3/061
2020/0065240 A1\* 2/2020 Choi ................. G06F 3/0679

\* cited by examiner

MANAGING CONFIGURATION DATA

CROSS-REFERENCE TO RELATED APPLICATION

This application claims priority to Chinese Patent Application No. CN201911053145.7, on file at the China National Intellectual Property Administration (CNIPA), having a filing date of Oct. 31, 2019 and having "METHOD FOR STORAGE MANAGEMENT, ELECTRONIC DEVICE, AND COMPUTER PROGRAM PRODUCT" as a title, the contents and teachings of which are herein incorporated by reference in their entirety.

FIELD

Embodiments of the present disclosure generally relate to the field of storage systems and more specifically, to a method for storage management, an electronic device, and a computer program product.

BACKGROUND

Storage system are currently designed to be simple, high-performance and economical. The storage systems can support the next-generation storage medium and achieve longitudinally expandable and transversely expandable architecture, a flexible consumption model, and high-level simplicity. However, with the rapid development of the information technology, there are growing demands on the storage systems. Therefore, it is desired to provide a solution for further improving the performance of the storage system.

SUMMARY

Embodiments of the present disclosure relate to an improved solution for storage management.

In a first aspect of the present disclosure, there is provided a solution for storage management. The method includes: detecting whether a transaction of modifying configuration data of a storage system is initiated, the configuration data being stored in a database storage area and a buffered version of the configuration data being stored in a memory independent from the database storage area; in accordance with a detection that the transaction is initiated, building a data buffer to buffer a target configuration data section to be modified, the data buffer being mapped to a storage sector of the memory in which the target configuration data section is expected to be stored; determining whether the transaction is successfully completed; and in accordance with a determination that the transaction fails to be successfully completed, releasing the data buffer and aborting the transaction, without modifying the buffered version of the configuration data.

In a second aspect of the present disclosure, there is provided an electronic device. The electronic device includes at least one processor; and at least one memory having computer program instructions stored therein, the at least one memory and the computer program instructions configured, with the at least one processor, to cause the electronic device to perform acts. The acts include detecting whether a transaction of modifying configuration data of a storage system is initiated, the configuration data being stored in a database storage area and a buffered version of the configuration data being stored in a memory independent from the database storage area; in accordance with a detection that the transaction is initiated, building a data buffer to buffer a target configuration data section to be modified, the data buffer being mapped to a storage sector of the memory in which the target configuration data section is expected to be stored; determining whether the transaction is successfully completed; and in accordance with a determination that the transaction fails to be successfully completed, releasing the data buffer and aborting the transaction, without modifying the buffered version of the configuration data.

In a third aspect of the present disclosure, there is provided a computer program product. The computer program product is tangibly stored on a non-volatile computer-readable medium and include machine-executable instructions which, when executed, cause a device to perform the method according to the first aspect.

It is to be understood that the content of the present disclosure is not intended to limit key features or essential features of embodiments of the present disclosure. Other features of the present disclosure will be readily understood from the following detailed description.

BRIEF DESCRIPTION OF THE DRAWINGS

The above and other objectives, features, and advantages of example embodiments of the present disclosure will become more apparent through the following detailed description with reference to the accompanying drawings. Several example embodiments of the present disclosure will be illustrated in the drawings by way of example without suggesting any limitation, in which.

Throughout the figures, the same or similar reference numerals represent the same or similar components.

DETAILED DESCRIPTION OF EMBODIMENTS

Figure 1:
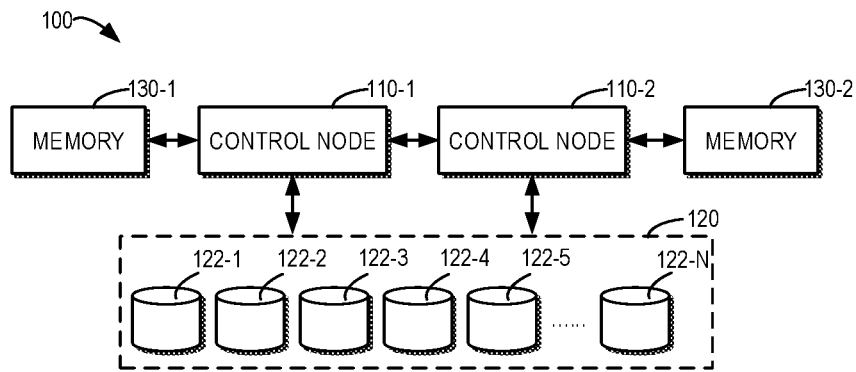
FIG. 1 illustrates a block diagram of an example storage system in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to several example embodiments illustrated in the drawings. It would be appreciated that description of those specific embodiments is merely for purpose of enabling those skilled in the art to better understand and further implement the present disclosure without suggesting any limitation to the scope disclosed herein in any manner.

FIG. 1 illustrates a schematic diagram of an example storage system 100 in which embodiments of the present disclosure can be implemented. In the example of FIG. 1, the storage system 100 is a dual control node-based storage system. As shown, the storage system 100 includes a control node 110-1, a control node 110-2, and a hardware storage pool 120. The control node 110-1 and the control node 110-2 sometimes are collectively or individually referred to as control nodes 110.

The hardware storage pool 120 provides a physical storage space for the storage system 100, the physical storage space including a plurality of storage disks 122-1, 122-2, 122-3, 122-4, 122-5 . . . 122-N (N being an integer larger than or equal to 1). For ease of discussion, the storage disks are sometimes collectively or individually referred to as storage disks 122. The storage disk 122 may include various devices for storage, including but not limited to, a Hard Disk Drive (HDD), a Solid State Disk (SSD), a removable disk, a Compact Disk (CD), a laser disk, an optical disk, a Digital Versatile Disk (DVD), a floppy disk, a blue-ray disk, a Serial Attached Small Computer System Interface (SCSI) Storage Disk (SAS), a Serial Advanced Technology Attachment (SATA) storage disk, any other magnetic and/or optical storage device, and/or combinations thereof.

In some embodiments, the storage system 100 may organize a physical storage space of the storage disks 122 using a Redundant Array of Independent Disks (RAID) algorithm. The control nodes 110-1 and 110-2 may have corresponding logic to provide RAID-based data storage and access. For example, the control node 110-1 may have RAID logic for providing a flat physical address space to mapper logic. The mapper logic is configured to manage mapping between physical addresses and logical addresses of the storage system 100 and provides a flat linear logical address space to namespace logic. The namespace logic utilizes the logical address space provided by the mapper and invokes an Application Program Interface (API) of the mapper logic to obtain the mapping between the logical addresses and the physical addresses. When the storage system 100 performs an I/O operation, an I/O request from a user is received by the namespace logic and sent to the mapper logic. The mapper logic looks up for a physical address of the data related to the I/O request (the address to which the data are written or from which the data are read) and initiates an I/O request to the RAID logic, to cause the RAID logic to actually perform the I/O operation on backend storage disks.

In the dual control node architecture shown by FIG. 1, the control node 110-2 synchronizes with the control node 110-1. In some embodiments, the control node 110-1 may serve as a primary control node and while the control node 110-2 may serve as a secondary control node. The control node 110-2 also can perform the I/O operation in the physical storage space and the logical storage space created on the storage disk 122. This architecture can provide a significant performance improvement. For example, when a control node fails, a further control node may immediately take over the storage space, such that the data of the users are safe, reliable, and accessible in the case of the failure. The control nodes 110-1 and 110-2 may include, but are not limited to, any devices with the computing capability, such as a computing device, a mainframe, a server, a personal computer, a desktop computer, a laptop computer, a tablet computer, a personal digital assistant, and/or the like.

The control nodes 110-1 and 110-2 may separately access their respective memories 130-1 and 130-2 (sometimes collectively or individually referred to as memories 130). Memories 130-1 and 130-2 may be provided to support operations of the control nodes 110-1 and 110-2, which may be a storage device having an access speed faster than the storage disks 122. In some examples, the memories 130-1 and 130-2 may, for example, be Random Access Memories (RAMs) of various types or any other memories providing quick access and the like.

Figure 2:
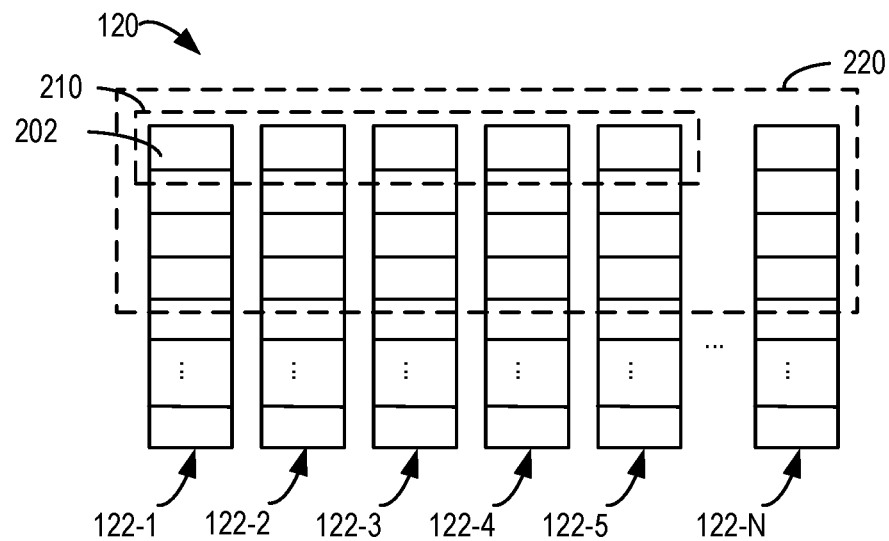
FIG. 2 illustrates a schematic diagram of an example configuration of a hardware storage pool in the storage system of FIG. 1.

In the RAID-based storage system, the physical storage disks 122 may be organized using various RAID algorithms, including traditional RAID algorithms and the architecture currently referred to as RAID 2.0. To better understand the RAID-based storage system, FIG. 2 illustrates an example structure of the RAID logic. As shown, the storage disks 122 are divided into a plurality of disk extents or disk slices 202. Such division may be performed on a logical level. A size of the disk extent 202 depends on the size of the storage disks and the division method. In some examples, the disk extents 202 may be at a level of gigabytes. For example, each disk extent may have a size of 4 GB or other sizes. Of course, other sizes of the disk extents are also feasible according to the actual deployment requirements.

The RAID logic is built in units of disk extents 202. In some storage systems with dynamic allocation, upon initial creation of the RAID logic, all disk extents are free. With data written, if the RAID capacity is found to be insufficient, the RAID logic will select a plurality of disk extents 202 from different storage disks 122 according to a given algorithm and organize these disk extents 202 as RAID blocks 210 (sometimes also referred to as Uber) of the RAID logic. The RAID blocks 210 may be considered as small-sized RAIDs since the I/O access and management of the RAID blocks 210 are similar to a conventional RAID.

The disk extents 202 may be selected from the plurality of storage disks 122 using any suitable algorithms, such as a Round-Robin algorithm, a weighted Round-Robin algorithm, or the like. The number of disk extents included in each RAID block 210 depends on the RAID type, providing different data redundancy and recovery levels. The RAID type includes RAID 2, RAID 3, RAID 4, RAID 5, RAID 6, RAID 7, RAID 10, and the like. In the example of FIG. 2, according to a type of RAID 5, each RAID block 210 includes five disk extents from different storage disks 122. However, it is to be understood that any other RAID types may be created on the basis of the storage disks 122 of the hardware storage pool 120.

In some embodiments, one or more RAID blocks 210 may form a storage area 220, which is sometimes referred to as a storage tier. A storage area 220 may be provided to users as a storage space for accessing and storing data. The storage system 100 may include storage areas 220 for different purposes, for example, a user storage area for storing user data, a mapper metadata storage area for storing metadata in the mapper, a log data storage area for storing logs, a log metadata storage area for storing metadata related to the logs, and a database (DB) storage area for storing data related to a configuration of the storage system 100 (also referred to as configuration data).

The DB storage area is sometimes referred to as a RAID DB storage area and the configuration data stored therein include metadata of the other types of storage areas. The present disclosure mainly focuses on storage management of the DB storage area. For ease of discussion, reference is made to the DB storage area 220 below. For example, the configuration data may include geometry information associated with a layout of the other types of storage areas, allocation conditions of storage areas and/or RAID blocks, online status of storage stripes in the storage areas and/or the RAID blocks providing redundant storage, a distribution of respective storage blocks of storage stripes among the disk extents, and the like. The metadata of the DB storage area 220 itself are stored on top of the hardware storage devices.

The DB storage area 220 may be divided into three parts, including an address sector, a buffer sector, and a data sector. The address sector is used for storing address information including an address of the buffer sector, and a head address and a tail address of the data sector. The buffer sector may be provided for buffering the configuration data to be stored. After the configuration data are accumulated to a certain amount, the data are stored into the data sector. The data sector occupies a large portion of the space in the DB storage area 220 mainly for storing configuration data. The storage space of the data sector is defined by the head address and the tail address. In some embodiments, the configuration data to be written are always appended to the tail of the data sector, including modifications to the original configuration data and newly added configuration data. Therefore, at a given time, there may be outdated data in the data sector.

To facilitate quick access of the control node, the data stored in the DB storage area 220 (e.g., the configuration data and the address information) are usually loaded into the memories 130-1 and 130-2, for example, at the startup of the system. The version of the data stored in the memories 130-1 and 130-2 are referred to as buffered versions of the data (e.g., buffered versions of the configuration data and buffered versions of the address information). Therefore, the control nodes 110-1 and 110-2 may rapidly read the configuration data from the memories 130-1 and 130-2, respectively and write the configuration data into the DB storage area 220 of the hardware storage pool 120 only when a modification to the configuration data is required.

It is to be understood that FIG. 1 only schematically illustrates units, modules or assemblies associated with the embodiments of the present disclosure in the storage system 100. In an example, the storage system 100 may not be based on the dual control node architecture and instead includes only one control node. Each component illustrated in FIG. 1 only illustrates the example storage system management architecture. Other division methods of the architecture may be used and other units, modules or assemblies for different functions may be included in other RAID-based storage systems. Therefore, the embodiments of the present disclosure are not limited to the specific devices, units, modules or components illustrated in FIG. 1. Instead, the embodiments are universally applicable to any storage systems based on RAID technologies. Respective components (except the hardware storage disk 122) illustrated in FIG. 1 may be implemented in a single computing device or a plurality of computing devices.

A modification to the configuration data usually is completed on the basis of a transaction. For example, if a new RAID block is allocated in the storage system for storage depending on a modification to the storage management or a user request, the control node may accordingly initiate a task for RAID block allocation. This task includes an adjustment to the configuration of the storage system as well as a modification to the configuration data in the DB storage area. Therefore, during the execution of the RAID block allocation task, the control node initiates a transaction of modifying the configuration data. If the transaction of modifying the configuration data is initiated, the control node first modifies the buffered version of the configuration data stored in the memory and then writes a modified section of the configuration data in the memory into the DB storage area of the hardware storage pool.

However, the buffered version of the configuration data in the memory has no redundant copy. If the buffered version is modified during the execution of the transaction of modifying the configuration data but a failure occurs in the DB storage area (e.g., this storage area becomes offline), the transaction cannot be aborted because the configuration data in the memory cannot be reverted back to the previous version and the configuration data in the DB storage area may be lost in view of the failure. In traditional solutions, the control node will keep retrying to execute the transaction of modifying the configuration data in the DB storage area. In some scenarios, the transaction of modifying the configuration data is a part of a task in the storage system and the constant attempt to complete this transaction also results into stagnation of corresponding upper-layer transactions. As a result, the transaction cannot be successfully completed and its failure cannot be reported. In this case, the task requester (e.g., the mapper logic) cannot be informed of the task status and thus also fails to take further actions to deal with such error.

In accordance with embodiments of the present disclosure, there is provided an improved solution for storage management. In this solution, if it is detected that a transaction of modifying configuration data of a storage system is initiated, a data buffer is built. Different from a storage area of a memory for buffering a buffered version of the configuration data, the data buffer is provided for buffering a target configuration data section to be modified. The data buffer is mapped to a storage sector of the memory in which the target configuration data section is expected to be stored. If the transaction fails, the data buffer is released and the transaction is aborted. In this case, the buffered version of the configuration data stored in the memory remains unmodified. According to the solution of the present disclosure, instead of directly modifying the buffered version of the configuration data in the memory, the data buffer is built for temporarily buffering the target configuration data section to be modified. Therefore, the configuration data in the memory remains as the previous version and are not modified before the transaction is successfully completed, which makes it possible to abort the transaction and avoid processing stalling and latency caused by the constant attempt of completing the transaction.

The embodiments of the present disclosure are described in detail below with reference to the drawings.

Figure 3:
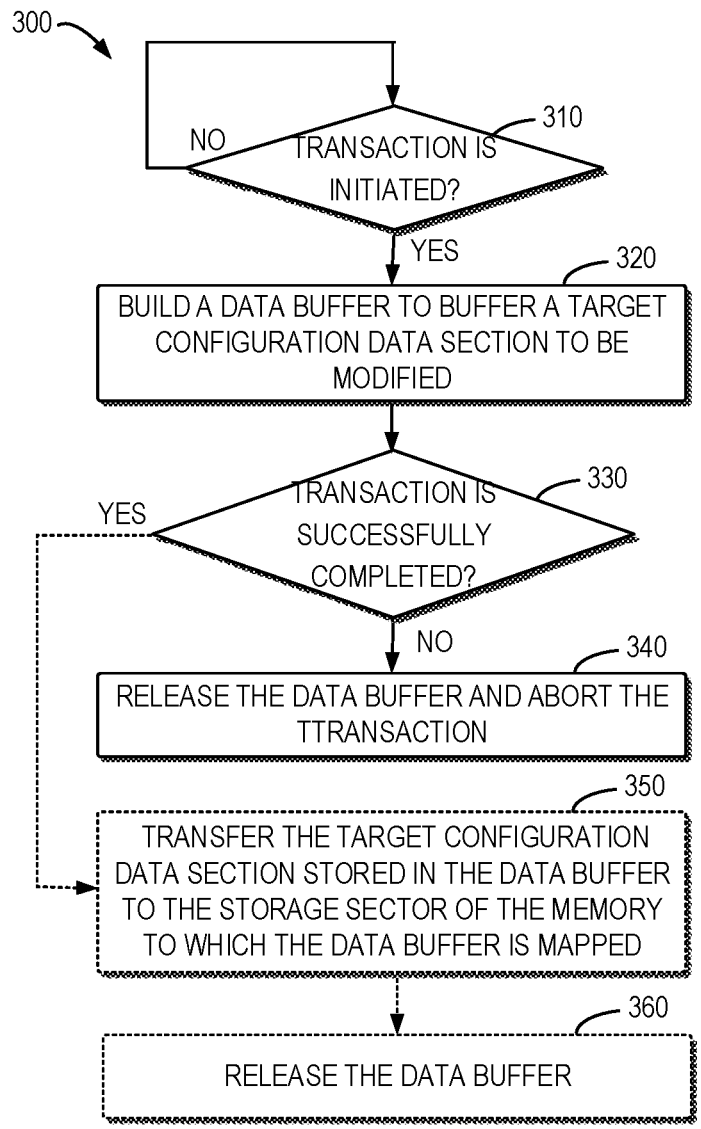
FIG. 3 illustrates a flowchart of a process for storage management in accordance with some embodiments of the present disclosure.

FIG. 3 illustrates a flowchart of a process 300 for storage management in accordance with embodiments of the present disclosure. In some embodiments, the process 300 may be implemented in the storage system 100, especially at the control node 110-1 or 110-2 (hereinafter collectively referred to as a control node 110). For ease of explanation, the description is made below with reference to the storage system architecture shown in FIGS. 1 and 2. However, it should be appreciated that the process 300 may not be limited to the applications shown in FIGS. 1 and 2 and instead may be applied to any other suitable types of storage systems.

At 310, the control node 110 detects whether a transaction of modifying configuration data of the storage system 100 is initiated. As mentioned above, the storage system 100 may be based on RAID for example and the DB storage area 220 of the storage system 100 is used for storing the configuration data of the storage system 100. In addition, the buffered version of the configuration data is also stored in the memory 130 independent from the DB storage area 220. Accessible by the control node 110, the memory 130 may provide a faster access speed than the DB storage area 220 built on the storage disks 122. Therefore, in operation, the control node 110 may read the configuration data directly from the memory 130 without accessing the DB storage area 220.

In some cases, the configuration data of the storage system 100 may change. For example, if it is required to add a new configuration data section, partially or fully update the current configuration data, or partially or fully delete the current configuration data, the transaction of modifying the configuration data may be initiated. The transaction may, for example, be a transaction in a task to request to update a configuration of the storage system 100. The task to request to update the configuration of the storage system 100 may include allocating new RAID blocks, modifying the configuration of the current RAID blocks, or the like. As long as the task involves changing the configuration of other types of storage areas in the storage system 100, it may initiate a modification to the configuration data in the DB storage area 220, which in turn initiates the transaction of modifying the configuration data.

In some embodiments, if the storage system 100 is based on the dual control node architecture and includes a primary control node and a secondary control node, a transaction of writing target configuration data section into the DB storage area 220 may be initiated at the primary control node, e.g., the control node 110-1. The control node 110-1 can detect the initiation of the transaction of modifying the configuration data of the storage system 100. However, during the execution of the transaction, the control node 110-2, as a secondary control node, also needs to perform some operations to complete the transaction. Therefore, if the process 300 is performed by the control node 110-2, the control node 110-2 also may determine the initiation of the transaction through an instruction of the control node 110-1. The execution of the transaction at the respective control nodes 110-1 and 110-2 will be discussed in detail below.

Upon detecting the initiation of the transaction, at 320, the control node 110 builds a data buffer to buffer a target configuration data section to be modified. The target configuration data section to be modified may be a newly added configuration data section, a part or all of the current configuration data to be modified, and/or a part or all of the current configuration data to be deleted.

In accordance with the embodiments of the present disclosure, instead of directly modifying the buffered version of the current configuration data stored in the memory 130 upon the initiation of the transaction, the data buffer is additionally built for temporarily storing the target configuration data section to be modified. The data buffer is mapped to a storage sector of the memory 130 in which the target configuration data section is expected to be stored. Usually, the transaction of modifying the configuration data will trigger the control node 110 to modify the buffered version of the configuration data in the memory 130. Therefore, the built data buffer is mapped to the storage sector of the memory 130 in which the target configuration data section is expected to be stored, which can facilitate subsequent data transfer.

Figure 4:
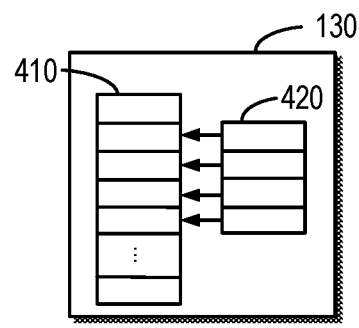
FIG. 4 illustrates a schematic diagram of an example for building a data buffer in the memory in accordance with embodiments of the present disclosure.

In some embodiments, the data buffer is built in the memory 130 accessible by the control node 110. It is to be understood that the data buffer also may be built in other storage devices accessible by the control node 110. FIG. 4 illustrates an example of building the data buffer in the memory 130. As shown, the memory 130 is stored with the buffered version 410 of the configuration data in the DB storage area 220. The buffered version 410 of the configuration data may be stored in the memory 130 in form of a data table including a plurality of data entries. After determining that the transaction of modifying the configuration data is initiated, the control node 110 builds the data buffer 420 in the memory 130. The data buffer 420 is mapped to a storage sector of the memory 130 in which the target configuration data section is expected to be stored. In the example of FIG. 4, it is assumed that the target configuration data section is a part of the configuration data to be modified or deleted, the data buffer 420 is mapped to the storage sector of the memory 130 in which the target configuration data section to be modified or deleted is currently stored.

It is to be noted that the storage and modification of the configuration data in the memory 130 may differ from the storage in the DB storage area 220. As mentioned above, the modified or newly added configuration data in the DB storage area 220 are appended to the tail of the data sector of the DB storage area 220. However, in the memory 130, if the configuration data are to be modified, the portion to be modified in the current configuration data is replaced with the target configuration data section. It is to be understood that if the target configuration data section to be written is an addition to the current configuration data, the data buffer 420 is mapped into a storage sector of the memory 130 that is newly allocated for storing the newly added configuration data.

In some embodiments, the control node 110 obtains a storage address of the target configuration data section to be modified (e.g., one or more entries to be modified/deleted, and/or one or more new entries) in the buffered version 410 of the configuration data and creates a mapping between the storage address and the storage address of the data buffer 420.

After building the data buffer, the control node 110 may turn to execute the transaction of modifying the configuration data. During the execution of the transaction, the buffered version of the configuration data stored in the memory 130 is not modified by the control node 110. At 330, the control node 110 determines whether the transaction has been successfully completed. The transaction of modifying the configuration data may include a plurality of operations involving both the two control nodes 110-1 and 110-2 in the dual control node architecture. In this process, the transaction of modifying the configuration data fails if any one of the operations is not successful completed.

Figure 5:
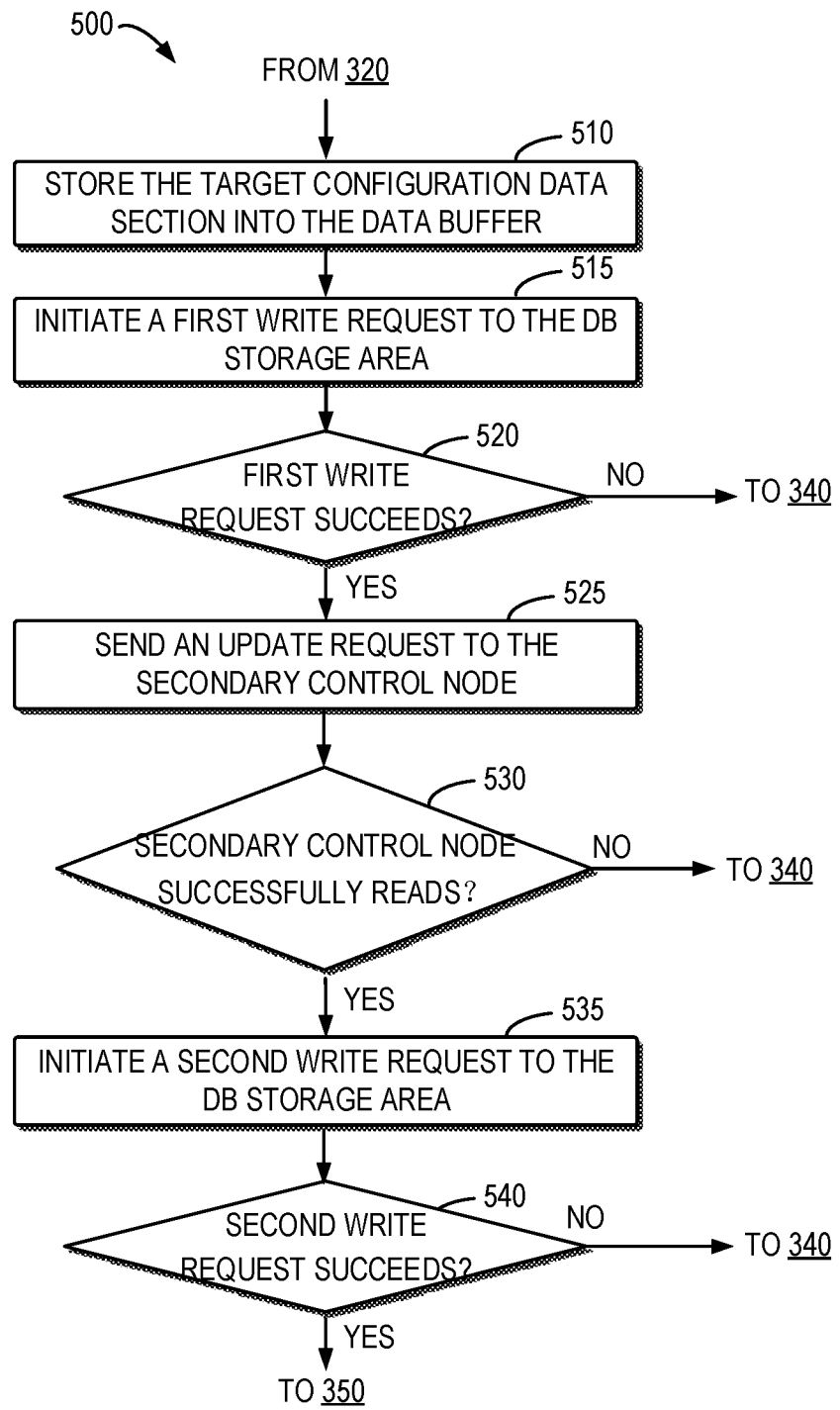
FIG. 5 illustrates a flowchart of a process for storage management in accordance with some other embodiments of the present disclosure.
Figure 6:
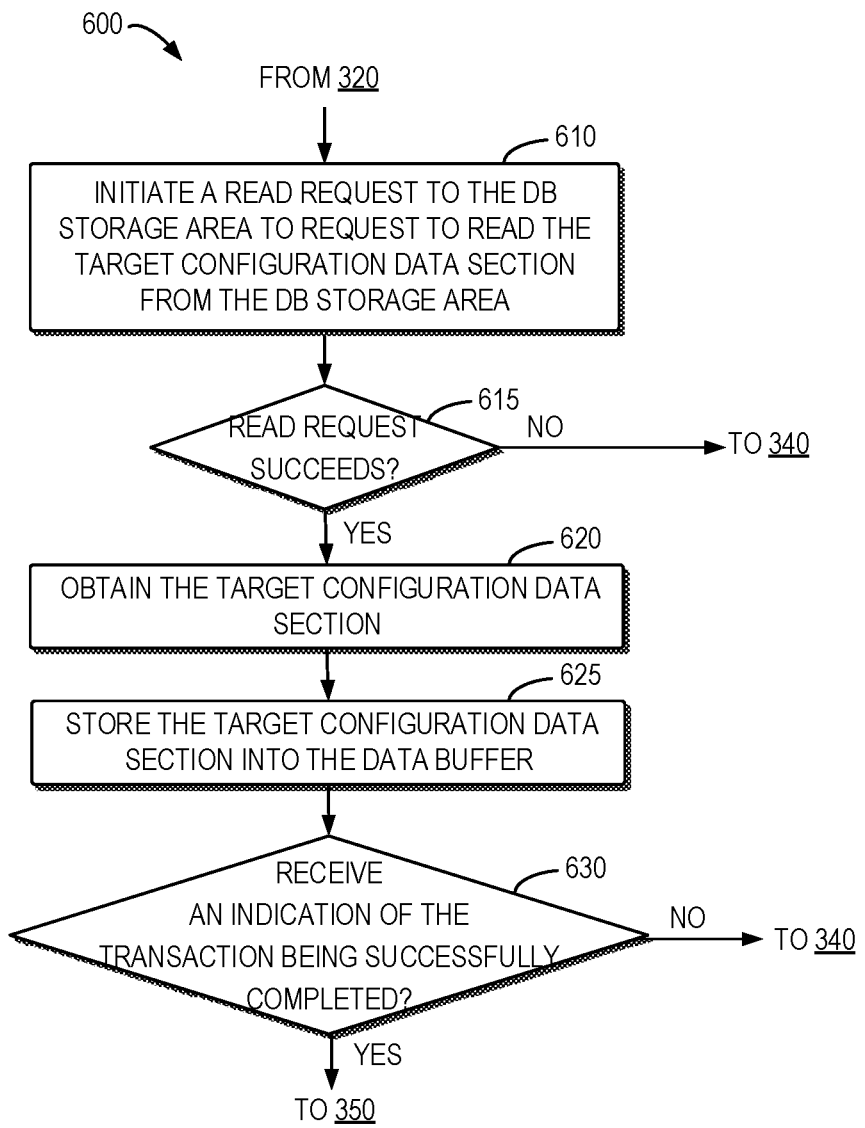
FIG. 6 illustrates a flowchart of a process for storage management in accordance with some further embodiments of the present disclosure.

In general, the transaction of modifying the configuration data may fail because of a failure of the DB storage area 220. For example, if the storage disks 122 forming the DB storage area 220 fail (e.g., become offline), the I/O request to the DB storage area 220 fails. In some embodiments, the DB storage area 220 is built based on a mirror technology. For example, the DB storage area 220 is a triple-mirror storage area, which means that the DB storage area 220 is distributed across three storage disks 122 to provide redundant storage of the data in the DB storage area 220. The three storage disks 122 store the same data. When one or two of the three storage disks 122 fail, normal data read and write in the DB storage area 220 can still be performed. However, if the three disks 122 all fail, the data cannot be read from or written into the DB storage area 220. The breakdown of the DB storage area 220 may occur at any stage of the execution of the transaction. Reference is made to FIGS. 5 and 6 below, which illustrate determination of whether the transaction has been successfully completed at respective stages of the execution of the transaction of modifying the configuration data from the perspectives of the control node 110-1 and the control node 110-2, respectively.

If it is determined that the transaction of modifying the configuration data cannot be successfully completed, the control node 110 releases the data buffer and aborts the transaction at 340. In this case, the buffered version of the configuration data stored in the memory 130 has not been modified, remaining as the original version. Therefore, if the transaction of modifying the configuration data is aborted, the configuration data still can be rolled back. When the transaction of modifying the configuration data is aborted, an execution status of the task initiating the transaction may be marked as failed. For example, as the primary control node, the control node 110-1 marks a status of the task as a failed status. Therefore, the control node 110 may take corresponding actions to fix the failure of the storage system without waiting for the completion of the task. When the failure is fixed, the task as well as the transaction of modifying the configuration data can be initiated again.

In some embodiments, if it is determined that the transaction is successfully completed, it means that the configuration data in the DB storage area 220 have been successfully modified. At 350, the control node 110 transfers the target configuration data section stored in the data buffer to the storage sector of the memory 130 to which the data buffer is mapped. Therefore, the buffered version of the configuration data in the memory 130 is also kept as consistent with the configuration data stored in the DB storage area 220. Further, the control node 110 releases the data buffer at 360.

The release of the data buffer includes releasing storage resources in the data buffer. If the data buffer has been stored with the target configuration data section, the target configuration data section is also released because it has been successfully stored in the memory 130 and the DB storage area 220.

The process 300 has been described above from the perspective of a general control node 110. In a storage structure based on the dual control nodes, the control node 110-1 acts as the primary control node and the control node 110-2 acts as a secondary control node. After determining that the transaction of modifying the configuration data is initiated, the control nodes 110-1 and 110-2 may perform different operations. In this process, the transaction may not succeed due to the failure of some operations.

In the following, reference is made to reference to FIGS. 5 and 6, which illustrate processes 500 and 600 for storage management in accordance with some embodiments of the present disclosure from the perspectives of the control node 110-1 and the control node 110-2, respectively.

Reference is first made to FIG. 5, where the process 500 is performed by the control node 110-1 acting as the primary control node. The transaction of modifying the configuration data may be initiated at the control node 110-1, which is able to directly detect the initiation of the transaction and further builds the data buffer. The data buffer is mapped to a storage sector of the memory 130-1 in which the target configuration data section is expected to be stored. After the data buffer is built at 320 of the process 300, the control node 110-1 performs the process 500.

Specifically, after building the data buffer, the control node 110-1 stores the target configuration data section into the data buffer at 510. As mentioned above, the target configuration data section to be modified may be a newly added configuration data section, a part or all of the current configuration data to be modified and/or a part or all of the current configuration data to be deleted. For the latter two situations, the control node 110-1 copies, from the buffered version of the configuration data stored in the memory 130-1, the data section to be modified and/or to be deleted to store into the data buffer.

At 515, the control node 110-1 initiates a write request (referred to as a "first write request" for ease of description) to the DB storage area 220 to modify the configuration data stored in the DB storage area 220. The first write request includes the address of the data buffer. In some embodiments, the control node 110-1 commits the transaction of modifying the configuration data, to cause the DB storage area 220 to perform data write.

At 520, the control node 110-1 determines whether the first write request succeeds, i.e., whether the target configuration data section in the DB storage area 220 has been successfully modified. If the first write request fails, which means that the DB storage area 220 fails and thus it fails to successfully respond to the first write request, the control node 110-1 determines that the transaction of modifying the configuration data fails to be successfully completed. In this case, the control node 110-1 performs the operation 340 of the process 300 as described with reference to the above process 300.

If it is determined that the first write request is successfully completed, i.e., the DB storage area still can normally respond to the write request at this point, the control node 110-1 turns to send an update request to the secondary control node (i.e., the control node 110-2) at 525 to request the control node 110-2 to read from the DB storage area 220 the target configuration data section to update a further buffered version of the configuration data maintained by the control node 110-2. The control node 110-2, in its accessible memory 130-2, also maintains a buffered version of the configuration data in the DB storage area 220. Therefore, when the control node 110-1 modifies the configuration data in the DB storage area 220 with the target configuration data section, the control node 110-2 is required to read, from the DB storage area 220, the modified target configuration data section to update the buffered version of the configuration data, thereby achieving data synchronization.

The control node 110-2 will make a response to the update request, which is described below with reference to FIG. 6. When the update request has been sent, the control node 110-1 determines, at 530, whether the control node 110-2 successfully reads the target configuration data section from the DB storage area 220. The control node 110-2 notifies the control node 110-1 of the completion status of the update request, i.e., whether the control node 110-2 can successfully read the target configuration data section from the DB storage area 220.

If it is determined, by the control node 110-1, that the control node 110-2 cannot successfully read the target configuration data section from the DB storage area 220, meaning that the DB storage area 220 fails and accordingly it fails to successfully respond to the read request, the control node 110-1 determines that the transaction of modifying the configuration data cannot be successfully completed. In this case, the control node 110-1 performs the operation 340 of the process 300 as described with reference to the above process 300.

If it is determined, by the control node 110-1, that the control node 110-2 cannot successfully read the target configuration data section from the DB storage area 220, the control node 110-1 turns to initiate a write request (referred to as a "second write request" for ease of discussion) to the DB storage area 220 at 535 to request to update address information of the configuration data stored in the DB storage area 220. As mentioned above, in addition to storing the configuration data in the data sector (or buffering a small amount of configuration data in the buffer sector), the DB storage area 220 further stores the address information of the configuration data (i.e., stored at the address sector). Modifications to the configuration data of the DB storage area 220 will lead to changes in the address information of the configuration data. For example, the newly added or modified target configuration data section is appended to the tail of the data sector, which requires updating the tail address of the data sector. The deletion of the current configuration data also leads to a change in the head address or the tail address of the data sector.

Therefore, when it is determined that the first write request is completed and the control node 110-2 successfully reads the modified target configuration data section, the control node 110-1 also needs to make a request of updating the current address information stored in the DB storage area 220 to the address information of the modified configuration data. At this time, it is also required to perform an I/O request for the DB storage area 220, i.e., the write request.

At 540, the control node 110-1 determines whether the second write request succeeds, i.e., whether the address information of the configuration data in the DB storage area 220 is successfully modified. If the second write request fails, meaning that the DB storage area 220 fails and accordingly it fails to successfully respond to the second write request, the control node 110-1 determines that the transaction of modifying the configuration data cannot be successfully completed. In this case, the control node 110-1 executes the operation 340 of the process 300 as described with reference to the above process 300.

If it is determined that the second write request is successfully completed, i.e., the DB storage area 220 still can normally respond to the second write request and correctly update the address information at this point, the control node 110-1 determines that the transaction of modifying the configuration data is successfully completed. In this case, the control node 110-1 executes the operation 350 of the process 300 as described with reference to the above process 300.

Reference is made to FIG. 6 where the process 600 is performed by the control node 110-2 acting as the secondary control node. After receiving the update request from the control node 110-1, e.g., the update request sent by the control node 110-1 at the operation 525 of the process 500, the control node 110-2 determines that the transaction of modifying the configuration data in the DB storage area 220 is initiated. In response to the initiation of the transaction, the control node 110-2 builds the data buffer mapped to the storage sector of the memory 130-1 in which the target configuration data section is expected to be stored, as described with reference to the above process 300. After the data buffer is built at 320 of the process 300, the control node 110-2 performs the process 600.

Specifically, after building the data buffer, at 610, the control node 110-2 initiates a read request to the DB storage area 220 to request to read the target configuration data section from the DB storage area 220 to store to the buffered version of the updated configuration data in the memory 130.

At 615, the control node 110-2 determines whether the read request succeeds, i.e., whether the data can be successfully read from the DB storage area 220. If the read request fails, meaning that the DB storage area 220 fails and accordingly it fails to successfully respond to the read request, the control node 110-2 determines that the transaction of modifying the configuration data cannot be successfully completed. In this case, the control node 110-1 performs the operation 340 of the process 300 as described with reference to the above process 300.

If it is determined that the read request is successfully completed, i.e., the DB storage area 220 still can normally respond to the read request at this point, at 620, the control node 110-2 obtains the target configuration data section. After that, the control node 110-2 stores the target configuration data section into the previously built data buffer at 625 and determines whether an indication of the transaction being successfully completed is received at 630. For example, after determining that the second write request to update the address information is successfully completed, the control node 110-1 may notify the control node 110-2 that the transaction is successfully completed.

If the indication of the transaction being successfully completed is not received, meaning that the DB storage area 220 malfunctions and accordingly fails to successfully respond to the second write request, the control node 110-2 determines that the transaction of modifying the configuration data cannot be successfully completed. In this case, the control node 110-2 performs the operation 340 of the process 300 as described with reference to the above process 300.

If the indication of the transaction being successfully completed is received, i.e., the DB storage area 220 still can normally respond to the second write request and correctly update the address information at this point, the control node 110-2 determines that the transaction of modifying the configuration data is successfully completed. In this case, the control node 110-2 performs the operations 350 and 360 of the process 300 as descried with reference to the above process 300.

Figure 7:
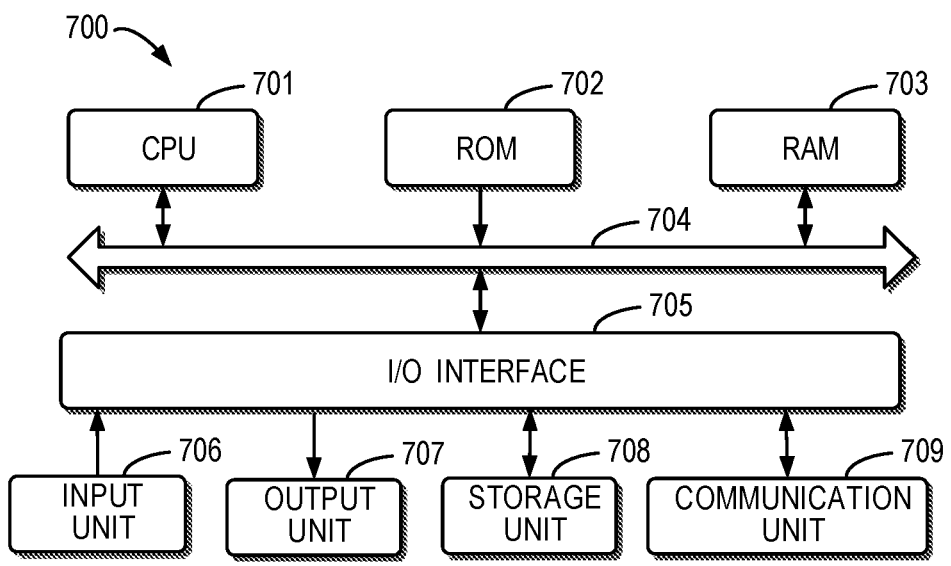
FIG. 7 illustrates a schematic diagram of a device that can be used to implement embodiments of the present disclosure.

FIG. 7 illustrates a schematic block diagram of a device 700 that can be used to implement embodiments of the present disclosure. The device 700 may be implemented as or included in the control node 110-1 or 110-2 of FIG. 1.

As shown in FIG. 7, the device 700 includes a central process unit (CPU) 701 which can execute various appropriate acts and processing according to computer program instructions stored in a read-only memory (ROM) 702 or loaded to a random-access memory (RAM) 703 from a storage unit 708. The RAM 703 can also store various programs and data required by the operations of the device 700. The CPU 701, ROM 702 and RAM 703 are connected to each other via a bus 704. The input/output (I/O) interface 705 is also connected to the bus 704.

The following components in the device 700 are connected to the I/O interface 705, including: an input unit 706, such as keyboard, a mouse, and the like; an output unit 707 including various kinds of displays and loudspeakers, and the like; a storage unit 708 including a magnetic disk, an optical disk, and the like; and a communication unit 709 including a network card, a modem, a wireless transceiver, and the like. The communication unit 709 allows the device 700 to exchange information/data with other devices via a computer network, such as the Internet and/or various telecommunication networks.

Various processes and processing described above, such as the processes 300, 500 and/or 600, can be performed by the processing unit 701. For example, in some embodiments, the processes 300, 500, and/or 600 can be implemented as computer software programs tangibly included in the machine-readable medium, e.g., the storage unit 708. In some embodiments, the computer programs can be partially or fully loaded and/or installed onto the device 700 via the ROM 702 and/or the communication unit 709. When the computer program is loaded to RAM 703 and executed by the CPU 701, one or more steps of the above described processes 300, 500, and/or 600 can be implemented.

As used herein, the term "comprise" and its variants are to be read as open-ended terms that mean "comprise, but is not limited to." The term "based on" is to be read as "based at least in part on." The terms "one example embodiment" and "an example embodiment" are to be read as "at least one example embodiment." The terms "first", "second" and the like may refer to different or the same objects. Other definitions, either explicit or implicit, may be included below.

As used herein, the term "determining" encompasses a wide variety of actions. For example, "determining" can include computing, computing, processing, deriving, investigating, looking up (e.g., looking up in a table, database, or another data structure), ascertaining, and the like. Further, "determining" can include receiving (e.g., receiving information), accessing (e.g., accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by special-purpose logic; the software part can be stored in a memory and executed by a suitable instruction execution system such as microprocessors or special-purpose hardware. Those ordinary skilled in the art can understand that the above method and system may be implemented with computer executable instructions and/or in processor-controlled code, for example, the code provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. By contrast, the execution order for the steps as depicted in the flowcharts may be varied. Alternatively, or in addition, some steps may be omitted, a plurality of steps may be merged into one step, or a step may be divided into a plurality of steps for execution. In practice, according to the embodiments of the present invention, the features and functions of two or more units described above may be embodied in one unit. In turn, the features and functions of one unit described above may be further embodied in more units.

Although the present disclosure has been described with reference to various embodiments, it would be appreciated that the present disclosure is not limited to the disclosed embodiments. The present disclosure is intended to cover various modifications and equivalent arrangements included in the spirit and scope of the appended claims.

We claim:

1. A method for storage management, comprising:
   detecting whether a transaction of modifying configuration data of a storage system is initiated, the configuration data being stored in a database storage area and a buffered version of the configuration data being stored in a memory independent from the database storage area;
   in accordance with a detection that the transaction is initiated, building a data buffer to buffer a target configuration data section to be modified, the data buffer being mapped to a storage sector of the memory in which the target configuration data section is expected to be stored;
   determining whether the transaction is successfully completed; and
   in accordance with a determination that the transaction fails to be successfully completed, releasing the data buffer and aborting the transaction, without modifying the buffered version of the configuration data;
   wherein the storage system is controlled by a primary control node and a secondary control node, the method being performed by the primary control node and the buffered version of the configuration data being maintained by the primary control node, and wherein the method further comprises: after building the data buffer,
   storing the target configuration data section in the data buffer; and
   initiating a first write request to the database storage area to request to modify the configuration data stored in the database storage area, the first write request comprising an address of the data buffer.

2. The method of claim 1, further comprising:
   in accordance with a determination that the transaction is successfully completed,
      transferring the target configuration data section stored in the data buffer to the storage sector to which the data buffer is mapped; and
      releasing the data buffer.

3. The method of claim 1, wherein the transaction is a transaction in a task to request to update a configuration of the storage system, the method further comprising:
   in accordance with a determination that the transaction fails to be successfully completed, causing an execution status of the task to be marked as failed.

4. The method of claim 1, wherein determining whether the transaction is successfully completed comprises:
   in accordance with a determination that the first write request is failed, determining that the transaction fails to be successfully completed.

5. The method of claim 1, wherein determining whether the transaction is successfully completed comprises:
   in accordance with a determination that the first write request is successfully completed, sending an update request to the secondary control node to request the secondary control node to read the target configuration data section from the database storage area to update a further buffered version of the configuration data maintained by the secondary control node; and
   in accordance with a determination that the secondary control node fails to read the target configuration data section from the database storage area, determining that the transaction fails to be successfully completed.

6. The method of claim 5, wherein the database storage area further stores address information of the configuration data, and wherein determining whether the transaction is successfully completed comprises:

in accordance with a determination that the secondary control node successfully reads the target configuration data section from the database storage area, initiating a second write request to the database storage area to request to update the address information to address information of the modified configuration data; and in accordance with a failure of the second write request, determining that the transaction fails to be successfully completed.

7. A method for storage management, comprising:

detecting whether a transaction of modifying configuration data of a storage system is initiated, the configuration data being stored in a database storage area and a buffered version of the configuration data being stored in a memory independent from the database storage area;

in accordance with a detection that the transaction is initiated, building a data buffer to buffer a target configuration data section to be modified, the data buffer being mapped to a storage sector of the memory in which the target configuration data section is expected to be stored;

determining whether the transaction is successfully completed; and in accordance with a determination that the transaction fails to be successfully completed, releasing the data buffer and aborting the transaction, without modifying the buffered version of the configuration data;

wherein the storage system is controlled by a primary control node and a secondary control node, the method being performed by the secondary control node and the buffered version of the configuration data being maintained by the primary control node, and wherein detecting whether the transaction is initiated comprises:

receiving an update request from the primary control node to request the secondary control node to read the target configuration data section from the database storage area to update the buffered version of the configuration data; and in accordance with a reception of the update request, determining that the transaction is initiated.

8. The method of claim 7, further comprising:

after building the data buffer, initiating a read request to the database storage area to read the target configuration data section from the database storage area, and wherein determining whether the transaction is successfully completed comprises:

in accordance with a failure of the read request, determining that the transaction fails to be successfully completed.

9. The method of claim 8, further comprising:

in accordance with a success of the read request, obtaining the target configuration data section from the database storage area; and storing the target configuration data section to the data buffer.

10. The method of claim 1, wherein building the data buffer comprises:

building the data buffer in the memory.

11. An electronic device, comprising:

at least one processor; and at least one memory having computer program instructions stored therein, the at least one memory and the computer program instructions configured, with the at least one processor, to cause the electronic device to perform acts comprising:

detecting whether a transaction of modifying configuration data of a storage system is initiated, the configuration data being stored in a database storage area and a buffered version of the configuration data being stored in a memory independent from the database storage area;

in accordance with a detection that the transaction is initiated, building a data buffer to buffer a target configuration data section to be modified, the data buffer being mapped to a storage sector of the memory in which the target configuration data section is expected to be stored;

determining whether the transaction is successfully completed; and in accordance with a determination that the transaction fails to be successfully completed, releasing the data buffer and aborting the transaction, without modifying the buffered version of the configuration data;

wherein the storage system is controlled by a primary control node and a secondary control node, the electronic device is the primary control node and the buffered version of the configuration data being maintained by the electronic device, and wherein the acts further comprises: after building the data buffer, storing the target configuration data section in the data buffer; and initiating a first write request to the database storage area to request to modify the configuration data stored in the database storage area, the first write request comprising an address of the data buffer.

12. The electronic device of claim 11, wherein the acts further comprise:

in accordance with a determination that the transaction is successfully completed, transferring the target configuration data section stored in the data buffer to the storage sector to which the data buffer is mapped; and releasing the data buffer.

13. The electronic device of claim 11, wherein the transaction is a transaction in a task to request to update a configuration of the storage system, the method further comprising:

in accordance with a determination that the transaction fails to be successfully completed, causing an execution status of the task to be marked as failed.

14. The electronic device of claim 11, wherein determining whether the transaction is successfully completed comprises:

in accordance with a determination that the first write request is failed, determining that the transaction fails to be successfully completed.

15. The electronic device of claim 11, wherein determining whether the transaction is successfully completed comprises:

in accordance with a determination that the first write request is successfully completed, sending an update request to the secondary control node to request the secondary control node to read the target configuration data section from the database storage area to update a further buffered version of the configuration data maintained by the secondary control node; and in accordance with a determination that the secondary control node fails to read the target configuration data section from the database storage area, determining that the transaction fails to be successfully completed.

16. The electronic device of claim 15, wherein the database storage area further stores address information of the configuration data, and wherein determining whether the transaction is successfully completed comprises:
- in accordance with a determination that the secondary control node successfully reads the target configuration data section from the database storage area, initiating a second write request to the database storage area to request to update the address information to address information of the modified configuration data; and
- in accordance with a failure of the second write request, determining that the transaction fails to be successfully completed.

17. An electronic device, comprising:
at least one processor; and
at least one memory having computer program instructions stored therein, the at least one memory and the computer program instructions configured, with the at least one processor, to cause the electronic device to perform acts comprising:
- detecting whether a transaction of modifying configuration data of a storage system is initiated, the configuration data being stored in a database storage area and a buffered version of the configuration data being stored in a memory independent from the database storage area;
- in accordance with a detection that the transaction is initiated, building a data buffer to buffer a target configuration data section to be modified, the data buffer being mapped to a storage sector of the memory in which the target configuration data section is expected to be stored;
- determining whether the transaction is successfully completed; and
- in accordance with a determination that the transaction fails to be successfully completed, releasing the data buffer and aborting the transaction, without modifying the buffered version of the configuration data;
- wherein the storage system is controlled by a primary control node and a secondary control node, the electronic device being the secondary control node and the buffered version of the configuration data being maintained by the primary control node, and wherein detecting whether the transaction is initiated comprises:
  - receiving an update request from the primary control node to request the secondary control node to read the target configuration data section from the database storage area to update the buffered version of the configuration data; and
  - in accordance with a reception of the update request, determining that the transaction is initiated.

18. The electronic device of claim 17, wherein the acts further comprise:
- after building the data buffer, initiating a read request to the database storage area to read the target configuration data section from the database storage area, and wherein determining whether the transaction is successfully completed comprises:
- in accordance with a failure of the read request, determining that the transaction fails to be successfully completed.

19. The electronic device of claim 18, wherein the acts further comprise:
- in accordance with a success of the read request, obtaining the target configuration data section from the database storage area; and
- storing the target configuration data section to the data buffer.

20. The electronic device of claim 11, wherein building the data buffer comprises:
- building the data buffer in the memory.

21. A computer program product having a non-transitory computer readable medium which stores a set of instructions to perform storage management; the set of instructions, when carried out by computerized circuitry, causing the computerized circuitry to perform a method of:
- detecting whether a transaction of modifying configuration data of a storage system is initiated, the configuration data being stored in a database storage area and a buffered version of the configuration data being stored in a memory independent from the database storage area;
- in accordance with a detection that the transaction is initiated, building a data buffer to buffer a target configuration data section to be modified, the data buffer being mapped to a storage sector of the memory in which the target configuration data section is expected to be stored;
- determining whether the transaction is successfully completed; and
- in accordance with a determination that the transaction fails to be successfully completed, releasing the data buffer and aborting the transaction, without modifying the buffered version of the configuration data;
- wherein the storage system is controlled by a primary control node and a secondary control node, the method being performed by the primary control node and the buffered version of the configuration data being maintained by the primary control node, and wherein the method further comprises: after building the data buffer,
- storing the target configuration data section in the data buffer; and
- initiating a first write request to the database storage area to request to modify the configuration data stored in the database storage area, the first write request comprising an address of the data buffer.

22. The method of claim 1, wherein the storage system includes first Random Access Memory (RAM) and second RAM which are separate from the database storage area;
- wherein the first RAM is accessed by the primary control node;
- wherein the second RAM is accessed by the secondary control node; and
- wherein building the data buffer includes:
  - forming the data buffer within the first RAM while the buffered version of the configuration data remains intact within the memory independent from the database storage area.

23. The method of claim 22, further comprising:
- at startup of the storage system, loading first initial configuration data from the database storage area into the first RAM for access by the primary control node, and loading second initial configuration data from the database storage area into the second RAM for access by the secondary control node.

* * * * *